Figure 3:
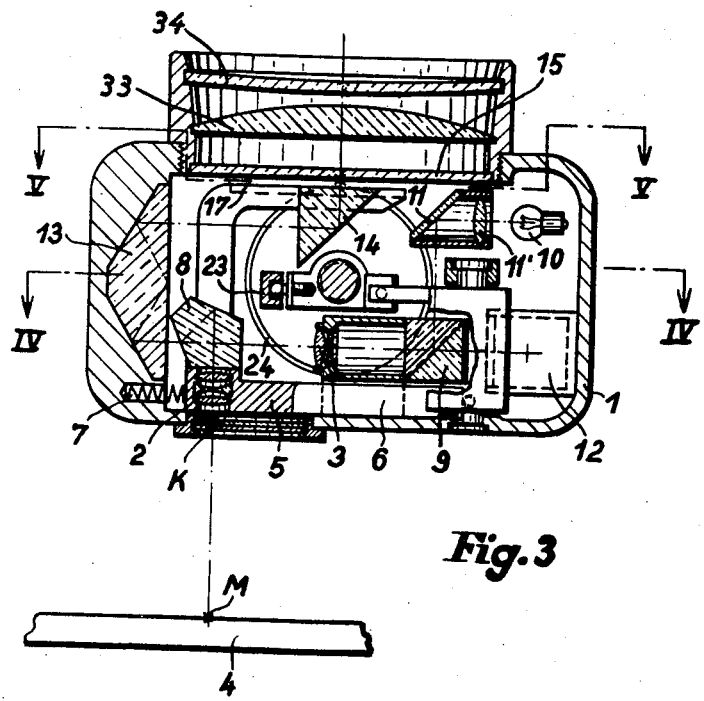

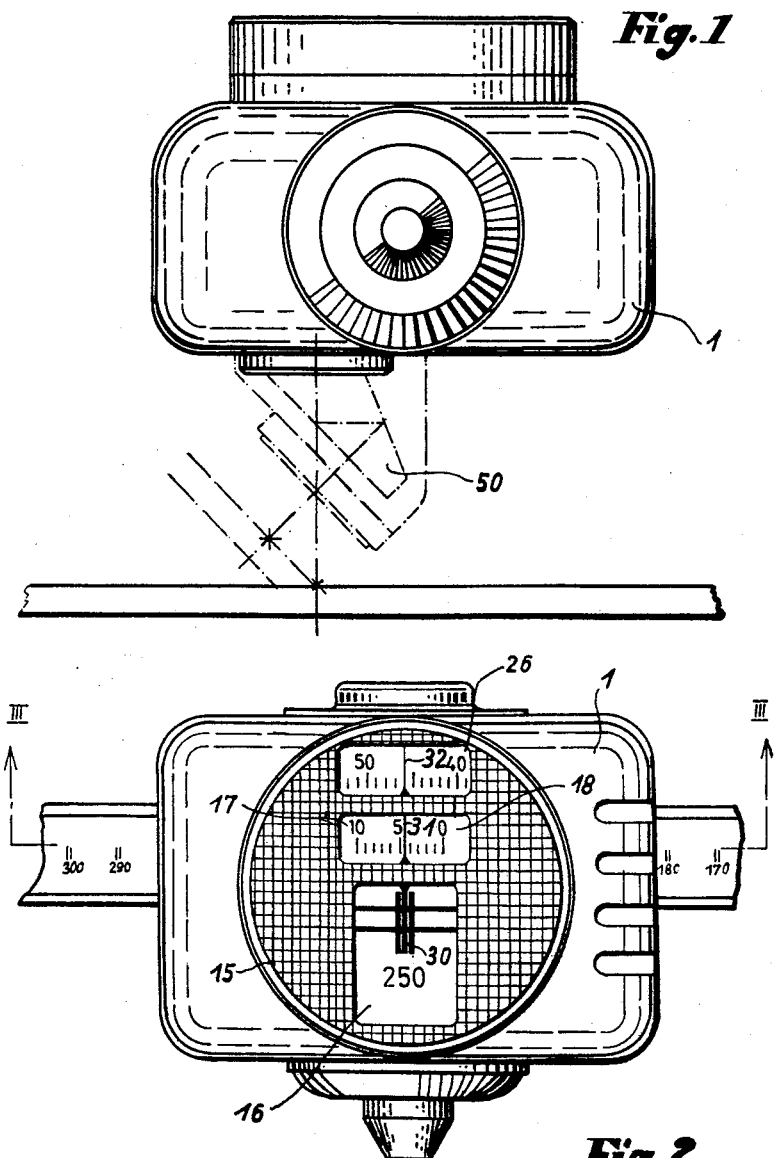

Oct. 29, 1963  K. RÄNTSCH ETAL  3,109,048
READING DEVICE FOR SCALES

Filed July 14, 1960  7 Sheets-Sheet 3

INVENTORS
KURT RÄNTSCH
HEINRICH STAADEN
BY Toulmin & Toulmin
ATTORNEYS

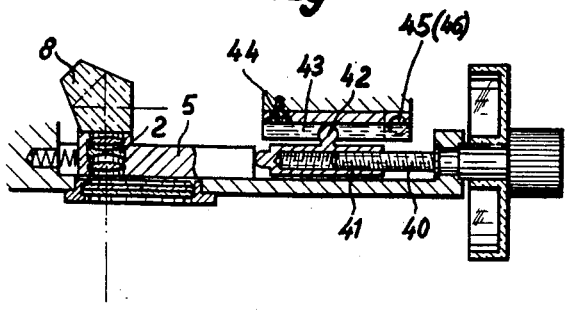
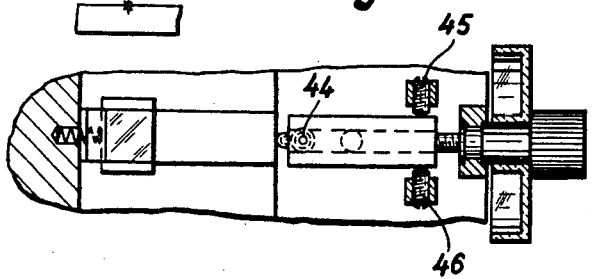
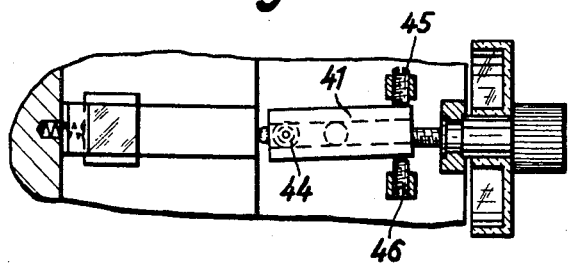

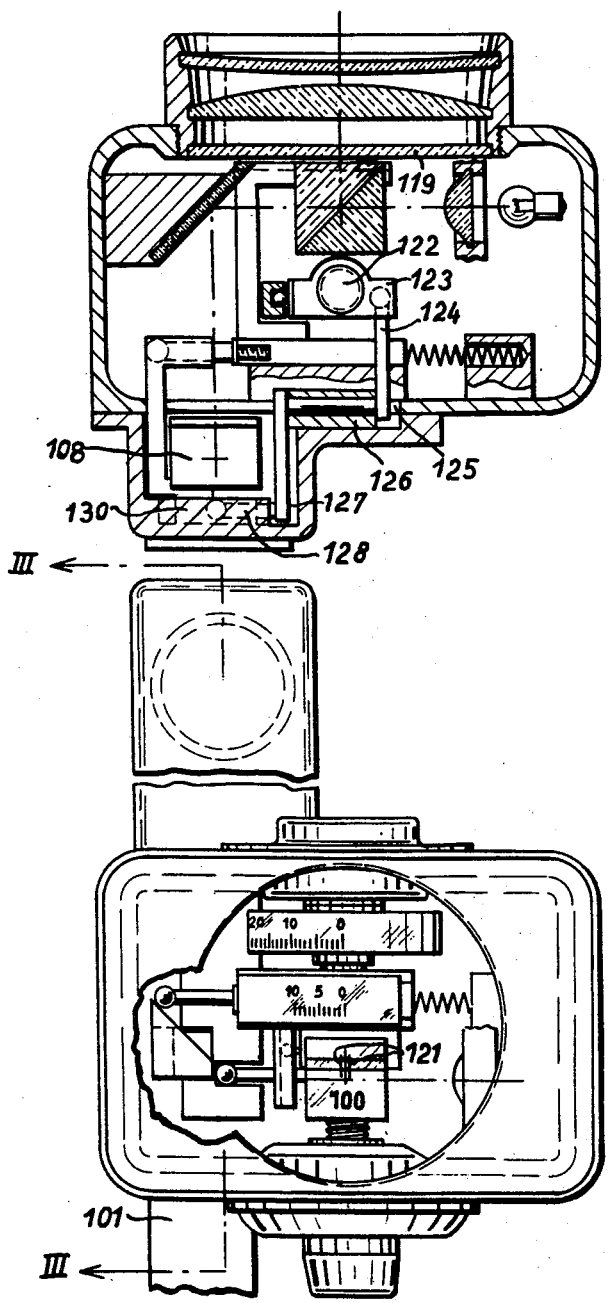

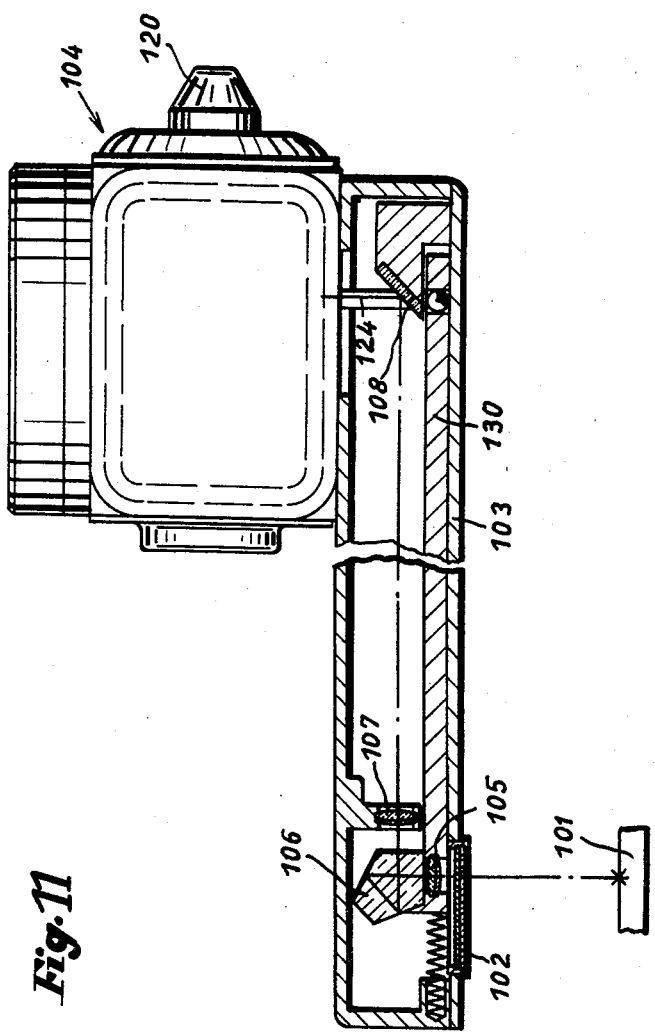

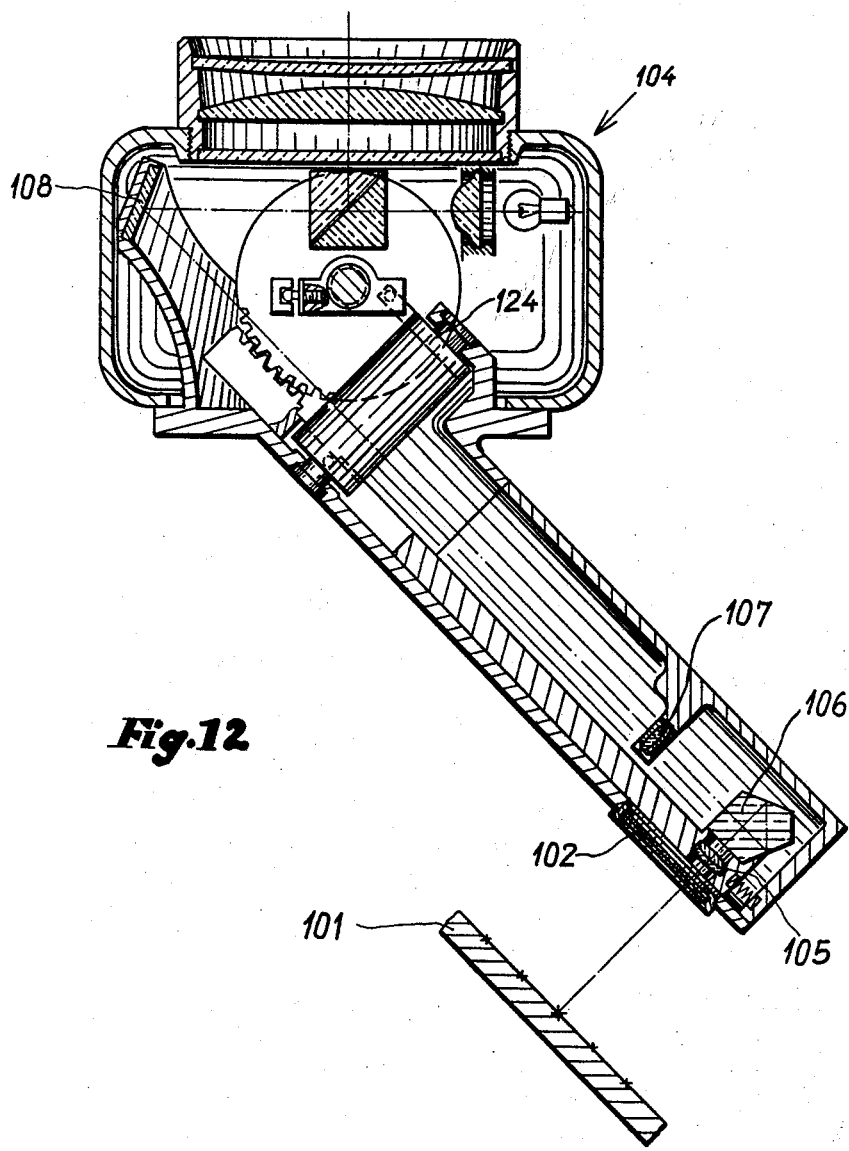

United States Patent Office 3,109,048
Patented Oct. 29, 1963

3,109,048
READING DEVICE FOR SCALES
Kurt Räntsch, Wetzlar (Lahn), and Heinrich Staaden, Braunfels, near Wetzlar, Germany, assignors to M. Hensoldt & Sohne, Optische Werke Aktiengesellschaft, Wetzlar (Lahn), Germany
Filed July 14, 1960, Ser. No. 42,885
Claims priority, application Germany July 17, 1959
13 Claims. (Cl. 88—1)

The present invention relates to a reading device for scales, scales of lengths or the like, and more in particular to a reading device of the type comprising means for projecting a division stroke of the scale in a reading window and for making the imaged division stroke coincide with a reference mark or the like.

It is known to provide a reading device of the aforementioned type. In this device the coincidence of the imaged division stroke and the reference mark is effected by providing the reference mark on a displaceable glass plate, which latter is displaced until division stroke and reference mark coincide. The amount of displacement of the glass plate indicates the fine measured value. The section of the scale with one or several strokes projected into a reading window is enlarged and, consequently, the glass plate must be displaced by comparatively great distances. It will be apparent that this is highly disadvantageous inasmuch as the reading device must be constructed at considerable length. It is for this reason that the known reading devices have comparatively great dimensions and are further not susceptible for uses where small sizes are required, as is particularly the case with machines, machine tools and the like.

It is, therefore, the general object of the present invention to provide a reading device for scales, scales of lengths or the like, of the aforementioned type, which is particularly adapted for use with machines, machine tools and the like.

The aforementioned object as well as further objects and advantages, which will be apparent from the following description, are achieved by the reading device for scales according to the invention, wherein the means for projecting a section of the scale into a reading window comprise an objective consisting of a first optical element and a second optical element. The first optical element is positioned at a distance from the scale identical with its focal length. Furthermore, means are provided for displacing this first optical element relative to the second optical element and parallel relative to the scale. The displacement of the first optical element is effected by means of a measuring screw. Both the first optical element and the measuring screw are each connected with a separate scale which appears in the reading window.

The first optical element of the objective is displaced by the measuring screw, and, consequently, the image of the section of the measuring scale moves in the reading window. At the same time, the reading scales connected with the first optical element of the objective and with the measuring screw, respectively, are also displaced and values of measurement corresponding to the displacement can be read in the reading window. The reading scales can be very small since they are only used for indicating the measured value. Furtheremore, the entire reading device can be very small because the displacement of the first optical element of the objective does not exceed the length of one interval on the measuring scale.

Figure 4:
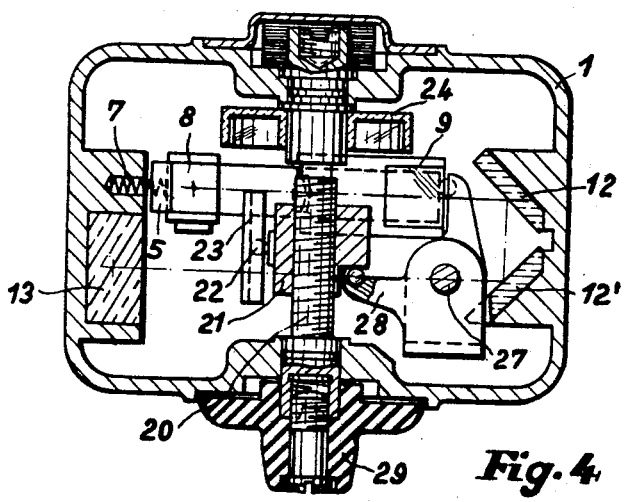
Figure 5:
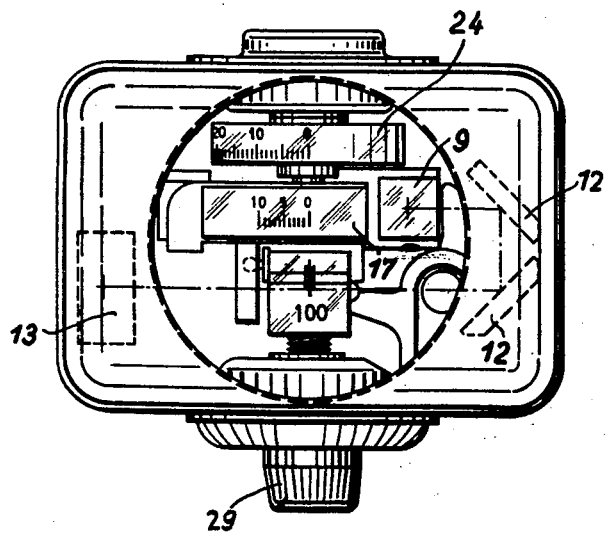

Further embodiments, modifications and features of the reading device of the present invention will be explained with reference to the accompanying drawings, wherein FIGURE 1 is a lateral view of the reading device of the invention;
FIGURE 2 is a plan view of the device shown in FIGURE 1;
FIGURE 3 is a sectional view along lines III—III in FIGURE 2;
FIGURE 4 is a sectional view along lines IV—IV in FIGURE 3;
FIGURE 5 is a sectional view along lines V—V in FIGURE 3.
FIGURES 6 to 8 are fragmentary, partially sectional views of another construction of the measuring screw for the device of the invention;
FIGURE 9 is a sectional view of another embodiment of the reading device of the invention;
FIGURE 10 is a plan view of the device of the invention;
FIGURE 11 is a sectional view along lines III—III in FIGURE 10;
FIGURE 12 is a sectional view of still another modification.

In the embodiment illustrated in FIGURES 3 to 5, the reading device of the invention is shown to have a casing 1 and therein an objective consisting of two optical elements 2 and 3. The optical element 3 is stationary, whereas the optical element 2 is capable of displacement parallel relative to a scale 4. For the latter purpose the optical element 2 is positioned in a body 5 which can be displaced in a guide 6, contrary to the pressure of a spring 7. A pentaprism 8 is located behind optical element 2, deflecting the light rays into optical element 3. Optical element 2 is spaced from measuring point M by the distance of its focal length and, consequently, the light rays between optical elements 2 and 3 are parallel.

A semi-transparent mirror 9 is positioned behind optical element 3 and is illuminated by light source 10 and a condensor lens 11' and mirror 11. The semi-transparent mirror 9 projects light into the path of rays for illuminating the surface of scale 4.

The light rays emanating from measuring point M pass through semi-transparent mirror 9 and reach a mirror 12 which reflects them onto a mirror 12' which, in turn, reflects the light rays to a prism 13 (see FIGURE 4). The prism 13 reflects the incoming light rays three times and passes them onto a prism 14 (see FIGURE 3). The prism 14 deflects the light rays to a reading window 15 and they appear in a field 16 (see FIGURE 2).

A scale 17 is connected with displaceable body 5. The scale 17 is located in the immediate vicinity of reading window 15 and it appears in a field 18 of the latter.

For the displacement of optical element 2 of the objective together with body 5 there is provided a measuring screw 20 connected with a nut member 21. The nut member 21 bears a pin 22 positioned in a guide 23 in such a manner as to be secured against rotation. Guide 23 can be tilted in a plane vertically relative to the plane of the drawings of FIGURES 3 and 4. As will be explained further below in connection with the description of FIGURES 6 to 8, the inclination serves the purpose of compensating a constant pitch error of measuring screw 20. A scale drum 24 is connected with measuring screw 20 and has a periphery reaching up to the immediate vicinity of reading window 15. The drum 24 is provided with numerals which appear in a field 26 of reading window 15.

It will be apparent that the scale of drum 24 and scale 17 appear at different locations in the reading window, preferably juxtaposedly. This facilitates the reading of the scales.

The nut member 21 actuates a rectangular lever 28, rotatable about shaft 27. The lever transforms the movement of nut member 21 into a movement of body 5, taking place at a right angle relative to measuring screw 20.

As will be seen in the drawings the measuring screw 20 extends through the entire device and its ends are so constructed that a turn knob 29 can be mounted at will at either end of the measuring screw. This feature is advantageous in-as-much as the reading device can be used for various types of machine tools and the turn knob of the reading device can be finally placed at the most convenient location on one of the ends of measuring screw 20.

The reading window 15 has three different fields 16, 18 and 26 within which are located reading marks 30, 31 and 32, respectively. The marks 31 and 32 are used for indicating a value on scale 17 and drum 24. The mark 30 is used for fixing the amount of displacement of optical element 2 of the objective. It has been found to be useful to provide a scale 4 having double-strokes spaced at centimeter intervals and to provide a scale 17 so as to divide one interval on scale 4 into ten equal units and to further provide drum scale 24 so as to indicate units of $\frac{1}{100}$ millimeter.

With the aid of a double-stroke on scale 4 appearing in reading window 15, mark 30 is captured by turning measuring screw 20. By turning measuring screw 20, optical element 2 and scale 17, connected with the latter, are displaced. At the same time, the numerical values on drum 24 pass along index mark 32 in the field 26. In the example shown in FIGURE 2 the reading obtains a measurement value of 254.46 millimeters. FIGURE 5 illustrates the zero position of the device with a captured $\frac{1}{100}$ millimeter stroke.

To facilitate observation of the reading window there is preferably provided an eye piece 33 and therebehind, in the direction of the light rays, a curved filter disk 34; the curvature is such that, if the disk is considered as a mirror, the eye of the observer will be imaged in itself. It has been found that such a disk is capable of eliminating inevitable reflexes on the respective surfaces of the eye piece and the reading window.

As will be seen in FIGURE 1, a prism 50 can be disposed in front of optical element 2, which prism deflects the optical axis of the path of rays passing through optical element 2. The prism 50 has an even number of reflecting surfaces so that, if the measuring screw is turned, for example clockwise, the double-stroke appearing in the reading window is displaced always in the same direction. The use of such a prism 50 is of advantage if the reading device is used with a machine tool which is so constructed that it is not possible to provide the measuring scale vertically below the reading device.

In the afore-described reading device measuring errors may result as a consequence of an error of the displaceable optical element 2, e.g. if the latter is slightly tilted during displacement. Such a guide error would cause a displacement of the image of a division stroke of scale 4 in reading window 15 and in order to make the image coincide with the respective reference mark, it would be necessary to turn the measuring screw by an additional amount. This additional turning of the measuring screw will introduce an error into the measured value. According to a further feature of the invention this error can be obviated by having the nodal point K of the displaceable optical element 2 in the plane of the guide 6 of body 5, thereby obtaining a condition fulfilling the requirements of the so-called "Eppenstein principle."

According to another embodiment of the invention, shown in FIGURES 6, 7 and 8, the measuring screw is designated with numeral 40 and acts in the direction of displacement of body 5, displacing a nut member 41, which latter is connected with a pin 42, gliding in guide 43. According to an advantageous feature of this embodiment guide 43 can be inclined by pivot pin 44 by means of two screws 45 and 46. FIGURE 8 illustrates guide 43 in an inclined position. If the measuring screw 40 is turned, nut member 41 is not only displaced axially, but it is also turned by a small amount about the axis of the measuring screw. The amount of rotation of the nut member depends on the degree of inclination of the guide 43. This rotary movement serves the purpose of compensating a constant pitch error of the measuring screw and, consequently, the inclination of the guide 43 is chosen to be sufficiently great for fully compensating a constant pitch error of the measuring screw.

It frequently becomes necessary to obtain a reading of the measured value at difficultly accessible locations, for example, if the reading device is to be used with a coordinate table forming a closed unit, with the measuring scale provided inside of the table. It would, of course, be entirely undesirable to place the reading device inside the table. This problem is solved by another embodiment of the invention illustrated in FIGURES 9 to 12 according to which the displaceable optical element of the objective is provided in a tubular detachable elongated body and wherein the measuring screw acts on the displaceable optical element via mechanical transmission members such as levers, rods and the like. This arrangement makes it possible to position only the tubular detachable elongated body close to the location of measurement, whereas the reading device comprising all other elements thereof can be mounted external of the machine tool.

As illustrated in FIGURE 11, the light rays coming from measuring scale 101 enter the tubular elongated detachable body 103 of the reading device 104 through a glass plate 102. The first, displaceable optical element 105 is provided behind glass plate 102 so that the light rays received from the measuring scale 101 leave optical element 105 in parallel. A pentaprism 106 is connected with optical element 105. The second optical element 107 is fixedly mounted in the tubular elongated detachable body 103 behind pentaprism 106. A mirror 108 deflects the light rays leaving optical element 107 into the interior of the reading device and collects them on a graticule 119. For the adjustment of a measurement value, a turn knob 120 is provided as well as a reference mark 121; the turn knob 120 is turned until mark 121 captures a division stroke, for example division stroke 100, as illustrated in FIGURE 10. The movement of turn knob 120 is transmitted to measuring screw 122 displacing a nut member 123. A lever 124 is connected with nut member 123 and actuates, through an opening 125 and further levers 126, 127, 128, a push rod 130, which, in turn, displaces optical element 105 within tubular detachable elongated body 103.

Since the tubular detachable elongated body 103 can be removed, the reading unit 104 can be provided with other elongated bodies which makes it possible to provide the same with a different set of optical elements and prisisms, most favorable for a particular machine tool.

According to a modification of the embodiment shown in FIGURES 9 to 11, illustrated in FIGURE 12, the tubular, detachable elongated body can be inclinedly positioned relative to the reading unit 104. This makes it possible to locate the reading unit 104 at the operating desk of the machine tool at an angular position which is most convenient to the operator.

It will be understood that this invention is susceptible to modification in order to adapt it to different usages and conditions and, accordingly, it is desired to comprehend such modifications within this invention as may fall within the scope of the appended claims.

What we claim is:

1. Reading device for measuring scales having a plurality of division strokes, comprising a reading window, objective means for projecting a section of said scale with a division stroke into said reading window, said objective means comprisnig a first optical element observing said scale and positioned at a distance therefrom identical with its focal length, so that the light rays on the image side of said optical element are parallel, a second optical element disposed in the light path from said first element so as to direct light therefrom towards said window and producing therein an image of said scale section, guide means for said first optical element, a measuring screw, means for drivingly connecting said screw to said first optical element for displacing the latter in said guide means relative to said second optical element along said light path between said two elements and parallel relative to said measuring scale, first reading scale means mounted adjacent said reading window and being connected with said first optical element, second reading scale means mounted adjacent said reading window and being connected with said measuring screw, and at least two reference marks in said reading window and associated with said first reading scale and said second reading scale, respectively.

2. Reading device according to claim 1, wherein the nodal point of said first optical element is located in the plane of said guide means.

3. Reading device according to claim 1, said division strokes on said measuring scale being spaced at centimeter intervals and said measuring scale being provided with millimeter reference numerals, said first reading scale being subdivided in ten intervals the sum total of which corresponds to one centimeter interval on said measuring scale, and said second reading scale indicating 1/100 millimeters.

4. Reading device according to claim 1, with said reading scale means connected with said measuring screw consisting of a drum bearing numerals the periphery of which reaches the immediate vicinity of said reading window.

5. Reading device according to claim 1, said means for connecting said screw to said first optical element including: a rectangular lever drivingly connected to said measuring screw and said first optical element, causing the latter to move at right angles with respect to said measuring screw.

6. Reading device according to claim 1, with said measuring screw extending through the entire reading device, and a turn knob, with either one of two ends of said measuring screw being adapted to receive said turn knob.

7. Reading device according to claim 1, comprising an eye piece associated with said reading window for enlargedly viewing the latter, and a curved filter disk behind said eye piece at the side opposite the side facing said reading window, with the curvature of said filter disk being so determined that, if considered as a mirror, it images the eye of an observer in itself.

8. Reading device according to claim 1, comprising an elongated detachable body containing said first optical element, and mechanical transmission means between said measuring screw and said first optical element.

9. Reading device according to claim 1, comprising a pentaprism connected with said first optical element on the image side thereof deflecting the light from said first element rectangularly with respect to the optical axis thereof towards said second element, and an elongated detachable tubular body containing said first optical element, said pentaprism and said second optical element.

10. Reading device for measuring scales having a plurality of division strokes, comprising a housing, a reading window in said housing, objective means for projecting a section of said scale with a division stroke into said reading window, a detachable elongated tubular body defining an axial direction and being inclinedly positioned relative to said housing, said objective means comprising a first optical element in said tubular body observing said scale and positioned at a distance from said scale identical with its focal length so that the light rays on the image side of said first optical element are parallel, guide means in said tubular body for said first optical element, said first optical element being movable in said guide means in said axial direction of said tubular body, a pentaprism connected with said first optical element in and deflecting the parallel rays along said axial direction of said tubular body, a second optical element in said tubular body responsive to said deflected parallel light rays and directing them towards said reading window and producing therein an image of said scale section, a measuring screw in said housing connected with said first optical element adapted for displacing the latter in said guide means relative to said second optical element and parallel relative to said measuring scale, mechanical transmission means between said measuring screw and said first optical element, first reading scale means mounted adjacent said reading window and being connected with said first optical element, second reading scale means mounted adjacent said reading window and being connected with said measuring screw, and at least two reference marks in said reading window and associated with said first reading scale and said second reading scale, respectively.

11. A reading device for measuring scales having a plurality of division strokes comprising a housing; a reading window in said housing; a first optical element at said housing observing a scale and positioned at its focal distance from said scale so that the light rays are parallel on the image side of said optical element; a pentaprism attached to said optical element at the image side thereof and deflecting its optical axis at a right angle with respect to the optical axis at the object side; means supporting said first optical element and being displaceable along the optical axis of the image side of said element; a second optical element disposed in the light path from said first optical element and directing light toward said reading window and imaging therein the scale section as observed by said first optical element; guide means for said first optical element; a measuring screw; means for drivingly connecting said screw to said first optical element for displacing the latter in said guide means relative to said second optical element along said light path between said two elements and parallel relative to said measuring scale; a first reference mark in said window and disposed in the light path on the image side of said second optical element; and scale and reference mark means visibly positioned adjacent said window in said housing and being movable with respect to each other with the movable portion thereof linked to any of said screw and said first optical element for common displacement.

12. Reading device for measuring scales having a plurality of division strokes, comprising a reading window, objective means for projecting a section of said scale with a division stroke into said reading window, said objective means comprising a first optical element observing said scale and positioned at a distance therefrom identical with its focal length so that the light rays on the image side of said optical element are parallel, a second optical element disposed in the light path from said first element so as to direct light therefrom towards said window and imaging therein the scale section as observed by said first optical element; a measuring screw; a nut member actuated by said measuring screw and being connected to said first optical element; a pin connected with said nut member; a guide member slidingly receiving said pin and being positioned tiltably in a plane parallel to the axis of said screw, said screw upon rotation displaces nut and said first optical element relative to said second optical element along the ray path between said first and second optical element; first reading scale means mounted adjacent said reading window and being connected with said first optical element, second reading scale means mounted adjacent said reading window and being connected with said measurnig screw and at least two reference marks in said reading window and associated with said first reading scale and said second reading scale, respectively.

13. A reading device for measuring scales having division strokes, the combination comprising: a housing having a reading window; a first lens means positioned in said housing at focal length from said measuring scale; means for sliding said lens in a first plane which includes the nodal point and being perpendicular to the optical axis; a measuring screw rotatably disposed in a central region of said housing with its axis being perpendicular to said optical axis and being drivingly connected to said sliding means for actuation thereof; a light source, a semitransparent mirror, a second lens means, and a first deflecting means positioned in said housing to define an optical path for illuminating said scale from said source through said first lens means; optical deflection means positioned in the light path from said second lens means through said semitransparent mirror to first shift said light path within a second plane extending between said first plane and said screw means, then in a third plane perpendicular thereto, said third plane being parallel to said optical axis of said first lens means, then in a fourth plane extending on the other side of said screw parallel to said first and second plane, and then towards said window, said second lens means imaging a portion of said scale as observed by said first lens means in said window; first reading scale means mounted adjacent said reading window and being connected with said first optical element, second reading scale means mounted adjacent said reading window and being connected with said measuring screw, and at least two reference merks in said reading window and associated with said first reading scale and said second reading scale, respectively.

References Cited in the file of this patent

UNITED STATES PATENTS

| | | |
|---|---|---|
| 2,921,374 | Rantsch et al. | Jan. 19, 1960 |
| 2,941,446 | Senglet | June 21, 1960 |

FOREIGN PATENTS

| | | |
|---|---|---|
| 760,881 | Great Britain | Sept. 24, 1954 |